United States Patent
Koerner et al.

(10) Patent No.: US 7,469,832 B2
(45) Date of Patent: Dec. 30, 2008

(54) METHOD FOR MARKING A LENS WITH A CODE AND METHOD OF PRODUCING A LENS

(75) Inventors: Steffen Koerner, Delligsen (DE); Martin Dobrescu, Lippstadt (DE); Thomas Hofmann, Erwitte (DE)

(73) Assignees: Schott AG, Mainz (DE); Hella KGaA Hueck & Co., Lippstadt (DE)

( * ) Notice: Subject to any disclaimer, the term of this patent is extended or adjusted under 35 U.S.C. 154(b) by 282 days.

(21) Appl. No.: 11/270,341

(22) Filed: Nov. 9, 2005

(65) Prior Publication Data
US 2006/0102724 A1    May 18, 2006

(30) Foreign Application Priority Data
Nov. 15, 2004 (DE) .................. 10 2004 056 073

(51) Int. Cl.
*G06K 7/10* (2006.01)
(52) U.S. Cl. .................. 235/462.01; 235/454
(58) Field of Classification Search ............ 235/462.01, 235/385, 454, 462.3
See application file for complete search history.

(56) References Cited

U.S. PATENT DOCUMENTS

| | | | |
|---|---|---|---|
| 5,201,927 A | 4/1993 | Nakamura et al. | |
| 6,103,148 A * | 8/2000 | Su et al. | 264/1.38 |
| 6,188,040 B1 | 2/2001 | Darmes et al. | |
| 6,555,184 B1 | 4/2003 | Aikawa et al. | |
| 6,811,259 B2 * | 11/2004 | Tucker | 351/177 |
| 7,044,429 B1 * | 5/2006 | Foreman et al. | 249/205 |

FOREIGN PATENT DOCUMENTS

| | | |
|---|---|---|
| DE | 198 14 480 A1 | 10/1999 |
| DE | 100 50 263 A1 | 4/2002 |
| WO | WO 03/087893 | 10/2003 |
| WO | WO 2004/000749 | 12/2003 |

OTHER PUBLICATIONS

Journal of Aircraft; "Product News"; Sprechsaal, vol. 121, No. 9, Aug. 1988; 4 pages.

* cited by examiner

*Primary Examiner*—Daniel St. Cyr
(74) *Attorney, Agent, or Firm*—Harness, Dickey & Pierce, P.L.C.

(57) ABSTRACT

A lens for illumination purposes is disclosed, in particular a lens for a headlamp for projecting the light emitted by a light source and reflected by a reflector in order to produce a pre-defined illumination pattern. Each lens is provided with an individualized code. For the purpose of coding, a laser is used, by means of which extremely small micro cracks are produced on the surface of the lens and can be read by means of a suitable reading device.

8 Claims, 3 Drawing Sheets

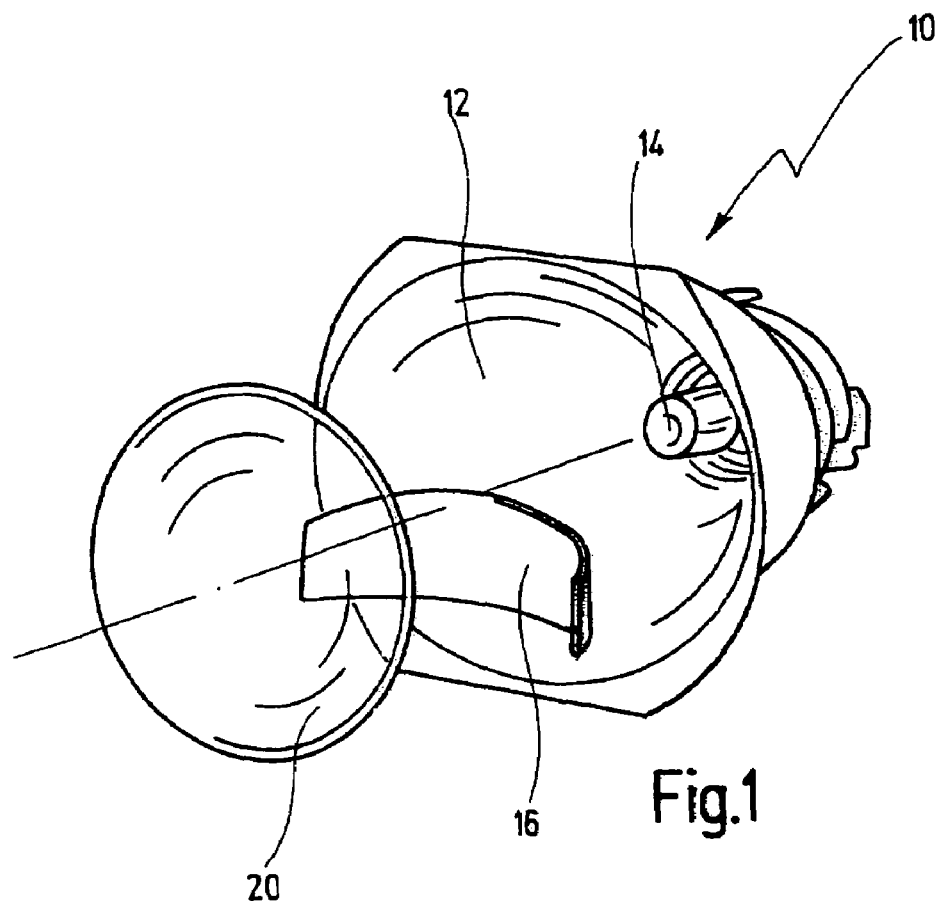
Fig.1
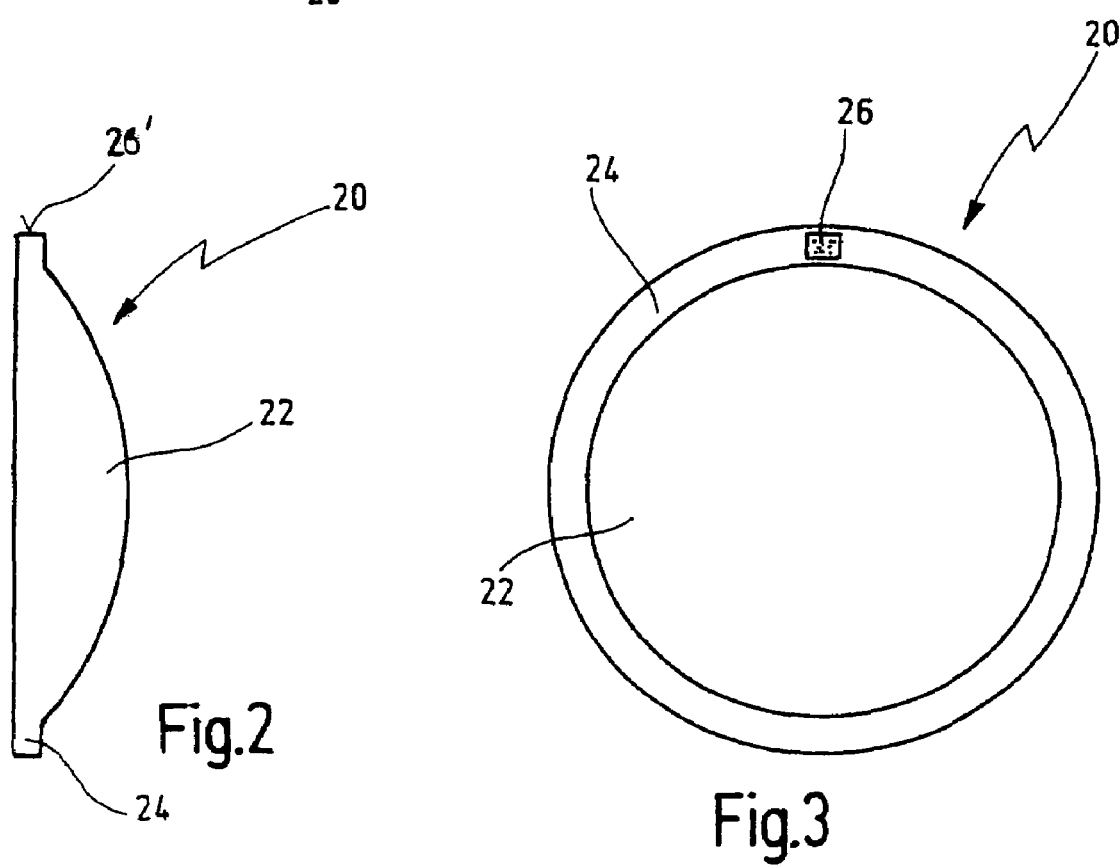
Fig.2
Fig.3

METHOD FOR MARKING A LENS WITH A CODE AND METHOD OF PRODUCING A LENS

BACKGROUND OF THE INVENTION

The invention relates to a lens for illumination purposes, in particular a lens for a headlamp for projecting the light emitted by a light source and possibly reflected by a reflector in order to produce a predefined illumination pattern.

The invention relates further to a method of producing a lens, in which the lens is produced in a production method which operates intermittently or cyclically.

The invention further relates to a method of marking a lens with a code.

Since the mid-80s, for cars in the upper and upper-middle-class, what is known as a "poly-ellipsoid headlamp" (PES) has been offered which, instead of the diffuser disc, has a plane-asphere as a lens, which is matched with a threefold ellipsoid reflector or, in recent times, also with free-form surface reflectors.

The basic structure of such headlamps is known and can be gathered from DE 198 14 480 A, for example. Such a PES head-lamp comprises a reflector which consists of a section of an ellipse and has a single light source, which is arranged in the region of the first focus of the reflector. In this headlamp, a plane-convex lens is provided at a distance from the reflector, its focus lying in a region of the second focus of the reflector. Inserted in between the reflector and the plane-convex lens is a mask, which is positioned in a region of the second focus of the reflector. It has an appropriately adapted shape in order that the bundle of light emerging from the head-lamp satisfies the prescribed light-dark limit.

Because of the stipulations relating to quality control in the car industry, which are increasing more and more in recent times, the quality requirements which are placed on such lenses increase continuously.

SUMMARY OF THE INVENTION

It is a first object of the invention to provide a method of producing a lens which allows for a simple and reliable demonstration of compliance with a quality standard.

It is a second object of the invention to disclose a method of marking a lens with a code that is highly reliable and allows for a read out of the code even after years of use.

These and other objects are solved according to the invention, by a lens having an individualized code and by a method of producing such a lens.

The lenses may be made of glass or plastic.

The object is, moreover, achieved by an apparatus for producing lenses for illumination purposes, having a shaping device for shaping lenses, in particular a pressing device for hot-pressing lenses, having a coding device for identifying the lenses with a code, and having a counting device which has a counter whose value can be increased by an increment with each lens supplied to the coding device, the coding device having a laser for producing a write beam and a laser control device for controlling the write beam, the counting device being coupled to the laser control device for controlling the write beam in such a way that individualization of the code as a function of the value of the counter is ensured.

The object of the invention is, moreover, achieved by a method for producing lenses comprising the following steps:
shaping a series of lenses, preferably in a production method that operates intermittently;
producing a characteristic value for each lens, and
producing a code on the lens, in particular on a surface of the lens, which is individualized as a function of the characteristic value for each lens.

In this way, the object of the invention is achieved completely.

Since each lens is specifically provided with an individualized code in a continuous production process, compliance with the predefined tolerance limits can be documented continuously and, in particular, each lens produced can be traced back completely at any time, even after relatively long use in a headlamp, with respect to the location and time of its production and, in particular, including the assignment to a production run whose quality was regularly checked and documented.

In an apparatus according to the invention, a counting device is provided having a counter whose value is increased by an increment with the supply of each lens. The write beam of the laser used for coding is controlled by its control device in such a way that a code individualized for each lens is produced on the lens.

The term "counter" is to be understood quite generally in this connection. In addition to a counter in the conventional sense, this is also to be understood to mean any electronic counter, that is to say for example also a timer which is used to produce a date or a time of day.

The individualized product data preferably have at least one characteristic value which is produced from a production process by a continuously running counter.

According to a further advantageous refinement of the invention, the code is applied to an optically inactive region of the lens.

In this case, the code can be provided, for example, on a circumferential fixing edge of the lens, which is designed to hold the lens.

These measures have the advantage that the optical functioning of the lens is in no way affected by the code and in that the code cannot be detected when the lens is installed.

In this case, the code can also be provided on the circumferential surface of the fixing edge.

This has the advantage that the code is also easily accessible for the purpose of reading when the lens is installed.

As already mentioned above, the code is preferably produced by means of a laser. This can be, for example, a $CO_2$ laser.

This has the advantage that the code can be applied in a particularly time-saving manner without mechanical detriment arising in this case. Furthermore, the code produced by a laser is very resistant and can still be read by means of a suitable reading device even after years of use.

According to a further embodiments of the invention, micro cracks or crystallization regions, which can be evaluated as a code, are produced by means of the laser beam.

In this way, a detrimental influence on the functioning and durability of the lens is avoided.

In addition, color changes can be used for the code. This is advantageous in particular for plastic lenses.

The code can comprise alphanumeric characters, for example.

According to a further particularly preferred embodiment of the invention, the code comprises a machine-readable code, in particular a data matrix code (DMC) according to the ECC 200 Standard.

The advantage of such a code is that a relatively large amount of information (15-character string) can be stored in a very small space (of, for example, 2.4×2.4 mm). This permits the code to be applied to the relatively small fixing edge of the lens, so that it is not visible when installed.

In order to make the individual bits (dots) of a machine-readable code highly legible and in order to ensure a very permanent code, micro shape changes in the form of break-outs or recesses are produced by a laser beam. These break-outs can be produced by the stresses induced by means of the laser beam. For this purpose, for example, the laser beam can move around an approximately self-contained curved path, for example in the form of a partial circle. In this case, if appropriate the intensity of the laser beam can additionally be changed in order, for example to induce the break-out of the glass at the end by means of a short increase in intensity. Alternatively, a plurality of point irradiations can be carried out in a predetermined pattern in order to induce the break-out.

The surface of such break-outs produced by stresses is relatively rough, so that high legibility results from the scattering action of the light.

It goes without saying that the features of the invention mentioned above and those still to be explained below can be used not only in the respective specified combination but also in other combinations or on their own without departing from the scope of the invention.

BRIEF DESCRIPTION OF THE DRAWINGS

Further features and advantages of the invention emerge from the following description of preferred exemplary embodiments with reference to the drawing, in which:

FIG. 1 shows the basic structure of a PES headlamp having a lens according to the invention in an exploded illustration;

FIG. 2 shows a side view of a lens according to the invention;

FIG. 3 shows a view of the lens according to FIG. 2 from the front;

DETAILED DESCRIPTION OF THE PREFERRED EMBODIMENTS

Figure 4:
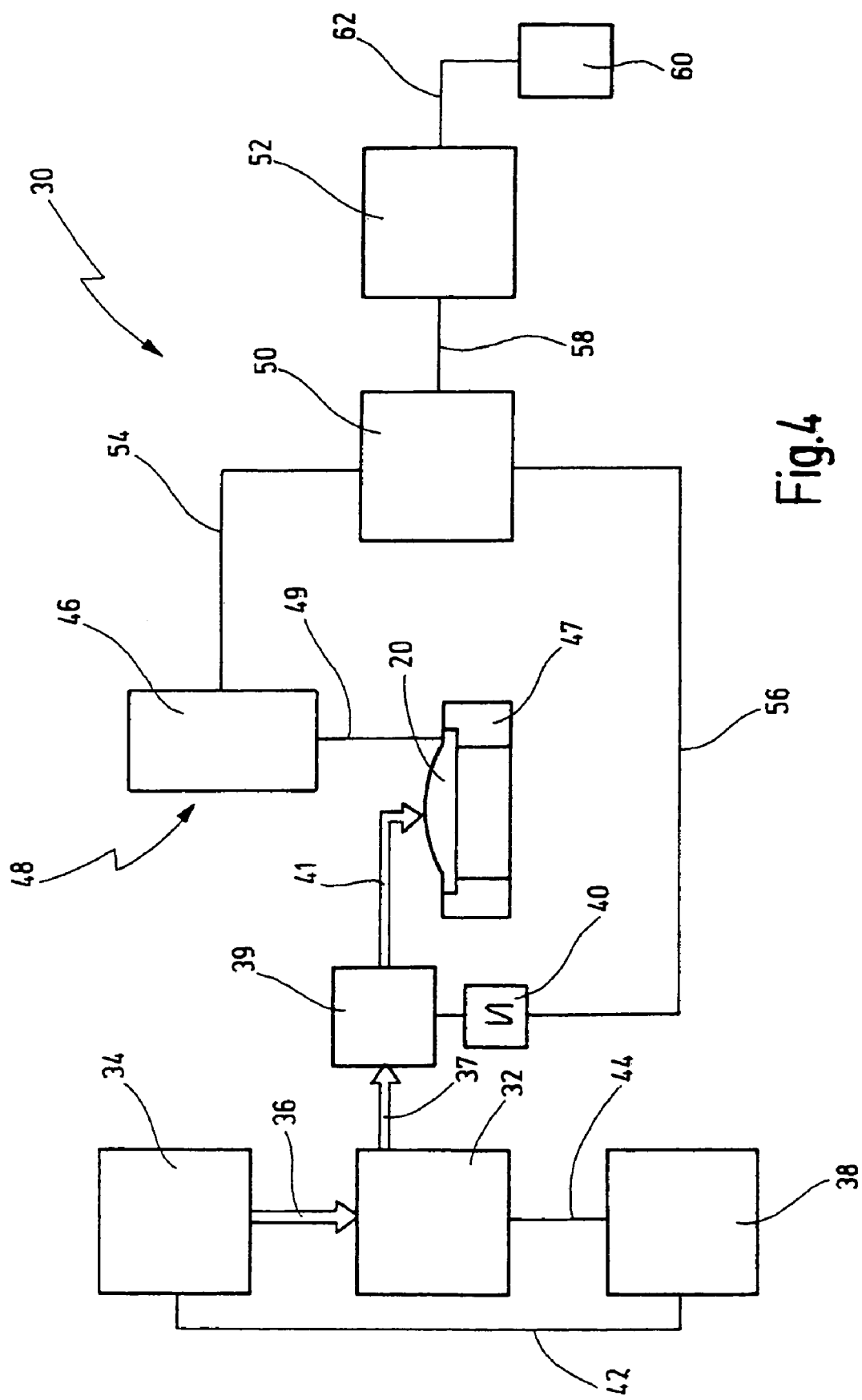
FIG. 4 shows a basic illustration of an apparatus according to the invention for producing lenses.

A poly-ellipsoid (PES) headlamp having a lens according to the invention is illustrated in FIG. 1 and designated overall by the number 10. The PES headlamp 10 comprises a poly-ellipsoid reflector 12, a light source 14, for example in the form of a halogen lamp, a mask 16 and a lens 20. The mask 16 is arranged in the beam path between the light source 14 and the lens 20. By means of the mask 16, the lower half of the beam is cut off, so that, after emerging after the lens 20, the headlamp light is directed substantially downwards. The graduation of the upper edge of the mask 16 achieves the situation in which the light beam is in particular deflected downwards to the right, in order to dazzle the opposing traffic as little as possible.

A lens 20 according to FIG. 1 is illustrated in the side view in FIG. 2. This is a plane-convex lens having an optically active region 22 and an optically inactive region 24, which is formed as a circumferential, plane-parallel edge region which projects outwards by a few millimetres from the plane-convex region.

As can be seen from the front view of the lens 20 according to FIG. 3, a code 26 having an area of about 2.4×2.4 mm is applied to the optically inactive edge region 24.

This code, which in principle could also have alphanumeric characters, preferably comprises a data matrix code (DMC) according to the ECC 200 Standard. This code is produced with the aid of a $CO_2$ laser and a suitable control device. By means of the laser beam, local micro cracks or depressions are produced on the glass surface and can be read as pixels by means of a suitable reading device.

Alternatively, the code can also be applied to the circumferential surface of the edge region 24, in particular of the fixing edge, as indicated at 26' in FIG. 2.

Depending on the composition of the glass used and in coordination with the laser beam, microcrystallization regions or elevations can alternatively be produced. However, the common factor in the microstructures produced is that they can all be read as pixels or pixel patterns by means of a suitable reading device.

In FIG. 4, an apparatus according to the invention for producing such a lens is illustrated and designated overall by the number 30.

The apparatus 30 has a shaping device, merely indicated schematically by the number 32, for shaping the lenses. The shaping device 32 is preferably a hot-pressing device, with which the lenses can be produced in one operation by hot-pressing, using a suitable press mold.

The shaping device 32 is fed with glass melt from a melting furnace 34, as indicated schematically by the arrow 36. In order to control the shaping device 32 and the output of glass from the melting furnace 34, a process control device 38 is provided, which is merely indicated schematically and which can be, for example, a SPS (stored program system) which, as indicated schematically, is coupled via lines 44 and 42 to the shaping device 32 and to the melting furnace 34, respectively.

The shaping device 32 is an apparatus that operates intermittently or cyclically and with which single lenses can be produced one after another or a plurality of lenses can be produced simultaneously. The lenses produced are output from the shaping device 32 and, if appropriate, initially accommodated in a storage container. As a rule, likewise after carrying out quality control at least in the manner of random sampling, the lenses are supplied one after another by a handling device 39 to a subsequent coding device, which is designated overall by the number 48. The handling device 39 comprises a counter 40, whose value n is increased by an increment upon the respective output of a lens to the downstream coding device 48.

In the downstream coding device 48, each lens is then provided with an individualized code, which is individualized at least as a function of the respective value of the counter 40 and, furthermore, can contain a series of further data.

The coding device 48 has a holder 47 for holding a lens 20, furthermore a laser 46 for coding the lens 20, an associated laser control device 50 and a scanner 52. The laser 46 has a write beam 49 which, by means of the control device 50, can be controlled via a control line 54 in a suitable way in order to produce the desired code 26 on the edge region 24 of the lens 20.

In this case, the value n of the counter 40, which is coupled to the laser control device 50 via the line 56, is taken into account in order to individualize the code of each individual lens 20. The scanner 52 can additionally be used in order to be able to adapt each code for each lens individually, it being possible for data relating to the production location, the production date, quality control data and the like also to be incorporated. Data 60 can be read into the scanner 52, as indicated by the arrow 62.

It goes without saying that, instead of an input via a scanner 52, the laser control device 50 could also be supplied in another way with individualized data for the purpose of coding, for example via a SPS interface with data from the production process, for example from the process control device 38, or can be supplied directly with data from the quality control.

By using FIGS. 5 to 7, it will be explained in the following how individual data bits of the code can be produced in the form of micro break-outs or recesses on a lens consisting of glass by means of a laser beam.

In this case, the machine-readable coding consists of data bits which are formed by a micro break-out at a predetermined point of the code or by the lack of such a micro break-out (that is to say a smooth surface at this point).

Figure 5:
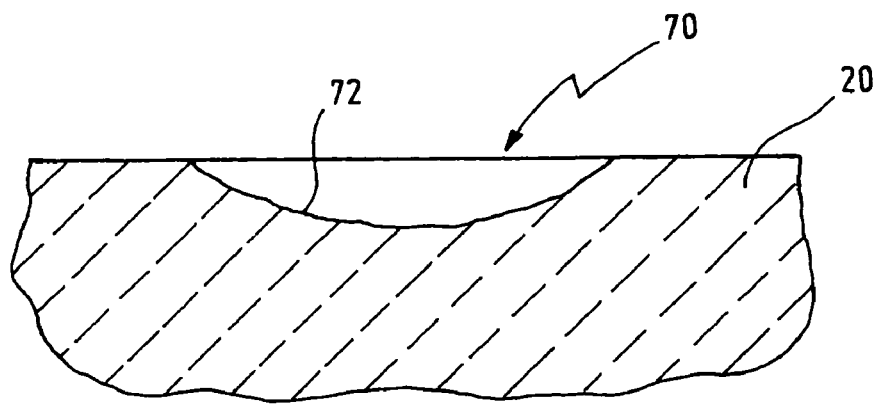
FIG. 5 shows a partial cross section through a lens according to the invention in the region of a data bit in the form of a micro break-out, in an enlarged illustration.

In FIG. 5, a data bit 70 in the form of a micro break-out is shown schematically in an enlarged illustration. The inner surface 72 of the micro break-out is relatively rough and thus, as a result of the scattering action, results in good contrast during reading.

Figure 6:
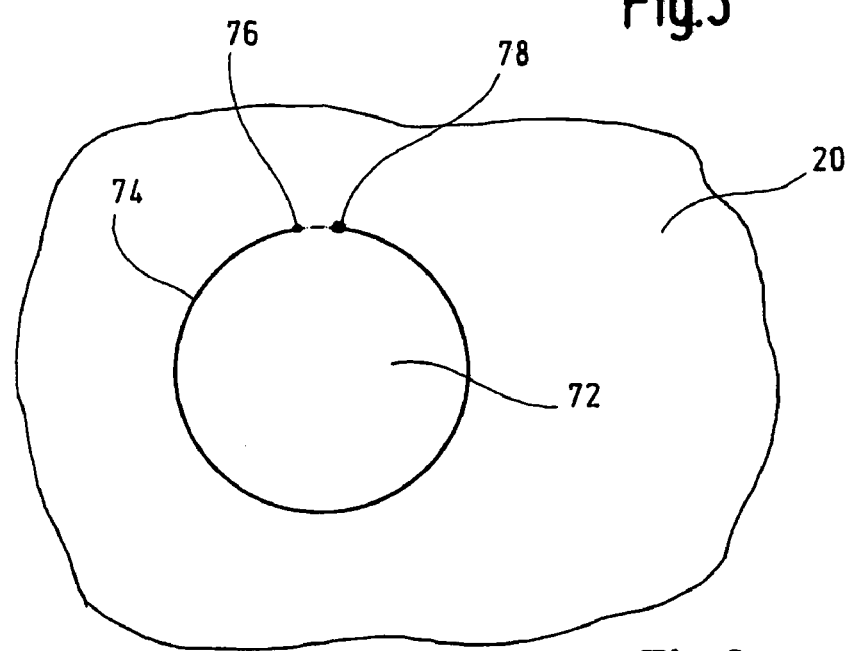
FIG. 6 shows a partial view of a lens according to the invention with the indicated travel path of a laser beam for producing a micro break-out for a data bit.

FIG. 6 shows how such a micro break-out can be produced by a laser beam. For this purpose, the laser beam moves on a virtually self-contained curved path 74 in the form of a part circle, beginning with a specific intensity at 76, and ending at 78, where the intensity is increased briefly. As a result of the stresses produced hereby, the micro recess is induced to break out.

Figure 7:
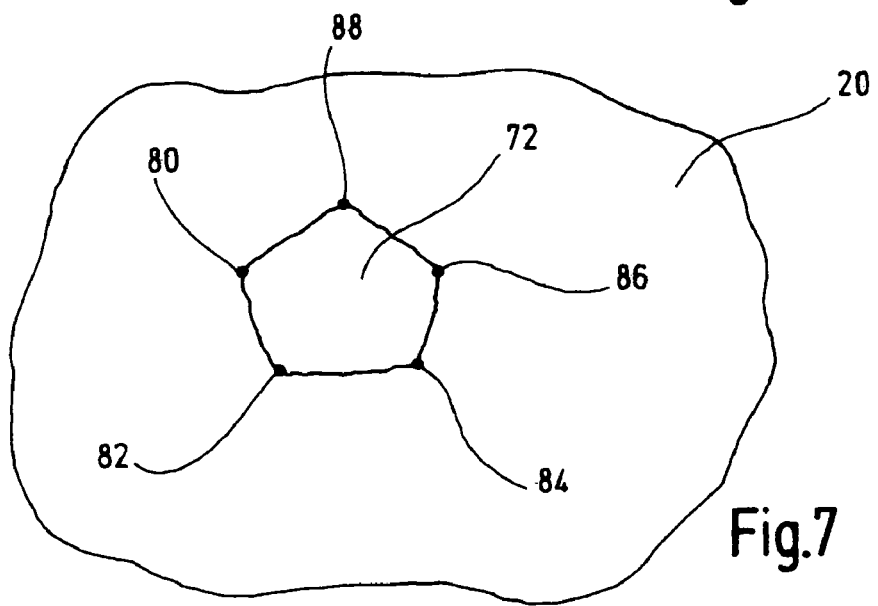
FIG. 7 shows a partial view of a lens according to the invention in the region of a data bit in the form of a micro break-out having a plurality of laser point irradiations indicated.

In FIG. 7, an alternative production of a micro break-out by means of a plurality of laser point irradiations at the points 80, 82, 84, 86, 88 is illustrated. Once again, the part circumscribed by the points 80 to 88 breaks out as a result of the induced stresses, so that the micro break-out having the surface 72 results.

The code produced is very permanent and can be read by means of a suitable reading device even after the rough operation in a motor vehicle and also after time periods of more than 15 years.

What is claimed is:

1. A method of marking a lens with a code, said method comprising the steps of:
   providing a lens made of a material selected from the group formed by a glass and a plastic, the lens including an optically active region and an optically inactive region;
   providing a code represented by a bit pattern comprising bits generated by local modifications of said lens, said bit pattern being configured for automatic read out for recognizing said code; and
   applying said code onto said optically inactive region of said lens.

2. The method of claim 1, wherein said bit pattern comprises at least one modification selected from the group formed by a micro crack, a crystallization region, a color modification, and a micro shape change.

3. The method of claim 2, wherein said bit pattern comprises bits formed by micro-recesses in the shape of micro break-outs, which are produced by stresses induced by means of a laser beam.

4. The method of claim 3, wherein said micro break-outs are produced by moving a laser beam directed onto said lens around a curved path which is at least partially closed.

5. The method of claim 3, wherein said break-outs are produced by a plurality of laser point irradiations of selected locations of said lens.

6. The method of claim 4, wherein said break-outs are induced by intensity changes of said laser beam.

7. The method of claim 5, wherein said break-outs are induced by intensity changes of said laser beam.

8. A lens for an illumination device for directing light received from a light source onto a scene for producing a pre-defined illumination pattern, said lens comprising an optically active region and an optically inactive region: and
   an individualized machine-readable code applied onto said optically inactive region of said lens, said code comprising data derived from a production process for producing said lens.

\* \* \* \* \*